Jan. 22, 1924.
G. F. BOESSER
1,481,281
IMITATION FROZEN CONFECTION AND METHOD OF MAKING THE SAME
Filed Feb. 21, 1923
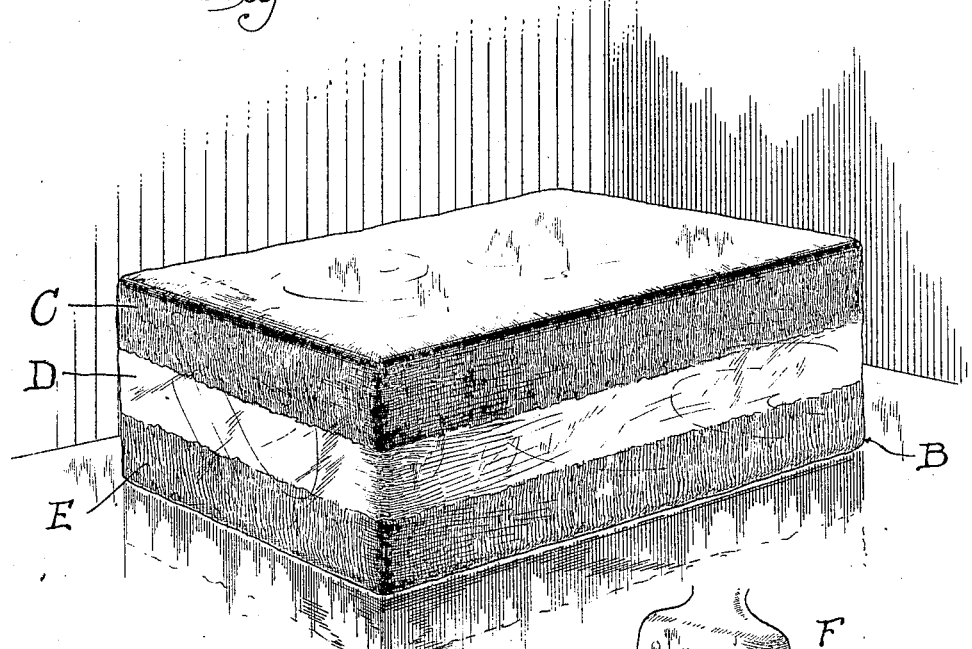
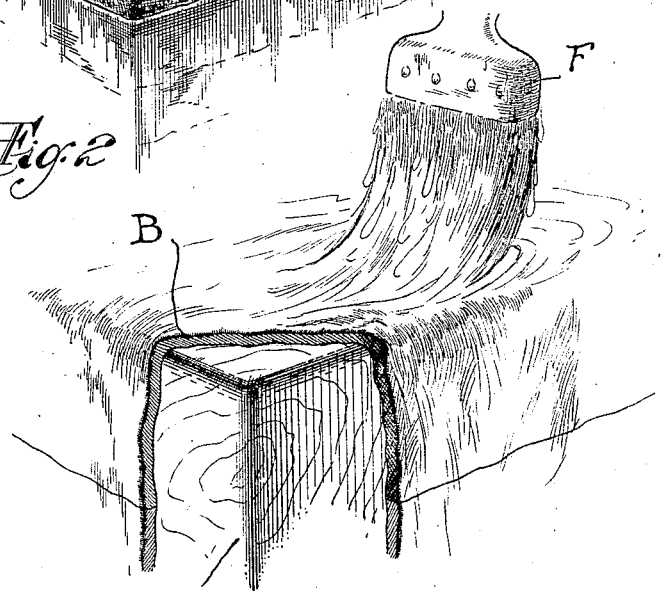
INVENTOR.
George Frederick Boesser,
BY
Everett H. Cook,
ATTORNEYS.

Patented Jan. 22, 1924.

1,481,281

UNITED STATES PATENT OFFICE.

GEORGE FREDERICK BOESSER, OF ARLINGTON, NEW JERSEY.

IMITATION FROZEN CONFECTION AND METHOD OF MAKING THE SAME.

Application filed February 21, 1923. Serial No. 620,350.

*To all whom it may concern:*

Be it known that I, GEORGE FREDERICK BOESSER, a citizen of the United States, and a resident of Arlington, in the county of Essex and State of New Jersey, have invented new and useful Improvements in Imitation Frozen Confections and Methods of Making the Same, of which the following is a specification.

This invention relates in general to displaying articles or matter of such character that display of the article or matter itself is impossible or not practicable on account of melting. More particularly the invention relates to a method of and artificial imperishable display device for advertising ice cream or other material having similar characteristics.

It is of course impossible or impracticable to display ice cream due to the rapid melting thereof when exposed to ordinary house, store or display window temperatures. Manufacturers and dealers have attempted to overcome this difficulty by pictorially representing "bricks" and dishes of ice cream on display cards, etc., but such displays are so unrealistic as to actually proclaim their artificiality, and are so commonly used that the public is not sufficiently interested to note the name of the manufacturer or dealer or the location of the store.

The primary object of my invention is to provide a method of and device for artificially displaying or advertising ice cream or the like in an extremely realistic manner by means of imperishable models or forms coated with a material of proper color and texture which accurately simulates the real ice cream or other matter.

The invention further consists in using paint for such a coating and causing the same to "run" or flow unevenly so as to give an appearance of melting.

Other objects of the invention are to simulate the slight granular or rough appearance of the surface of ice cream or the like by mixing a suitable granular, finely divided or powdered material in the coating of paint, or sprinkling such material on the paint after it is applied to the form, and to obtain other results and advantages as may be brought out by the following description.

For the purpose of explaining the principles of the invention, I have illustrated one preferred embodiment of the invention in the accompanying drawings in which the same characters of reference designate corresponding and like parts throughout the several views.

Referring to said drawings,

Figure 1 is a perspective view of a model or form embodying my invention and representing a block or "brick" of ice cream, and Figure 2 is an enlarged fragmentary perspective view, partially in section, showing one corner of the form.

In the specific embodiment of the invention illustrated in the drawings, the reference character A designates a rectangular block of suitable rigid and durable material of a shape and size corresponding to the ordinary block or "brick" of ice cream. The said form may be constructed of wood, plaster of Paris, papier-mâché, tin, folded cardboard, stone, concrete, etc., but is preferably of a cheap and durable material such as wood. While I have shown the form as rectangular in shape to represent a brick of ice cream, it will be understood that the shape of the form may be varied as desired, for instance spherical or semi-spherical, to represent ice cream formed in ornamental molds or the like.

The form A is coated in any suitable manner with paint B which is of a color corresponding to the color of ice cream which it is desired to represent. Where a brick of ice cream is to be represented, the form may be coated with different colored paints as indicated at C, D and E in Figure 1 to represent three different flavors of ice cream. The coating may be applied to the form by dipping the form in the paint, or by spreading the paint on the form by means of a brush F, knife or the like. It has been found that paint applied to the form closely simulates the "creamy effect" of the surface of ice cream, and preferably the paint is allowed to "run" slightly thereby producing an appearance very close to that of slightly melted ice cream. This melting appearance of the display device may be increased as desired by the operator in spreading the coating to produce an uneven, undulated surface, or making the coating of different thicknesses at different points. Also, the paint is preferably of thick consistency or applied in a layer which would be considered thick by those skilled in the art of painting. The coating is preferably what is known as "flat paint," or such that it will not produce an extremely glossy finish when dry, but where gloss finish paint is used, the gloss may be reduced or obliterated by rubbing the surface with a fine abrasive or the like.

To further simulate the creamy and granular appearance of the surface of ice cream, I may mix a suitable granular, finely divided or powdered material in the paint, or said powdered or granular material may be sprinkled on the surface of the paint after the latter has been applied to the form. The granular or powdered material may be ground wheat, ground or pulverized glass, sand, or the like, and preferably it is mixed with the paint before applying the coating so that said paint will "run" or drain off the particles enough to make them show and give the appearance of melting.

Such a display article may be placed in any desired position under any conditions, is durable so as to withstand rough usage and handling, and can be repeatedly washed without destroying its appearance and utility. The display article made up into forms similar to the usual forms in which ice cream is sold or distributed by manufacturers so closely simulates real ice cream that a very close inspection is necessary to discover the artificial nature of the article.

While I have shown and described the invention in connection with the display of ice cream, it will be understood that it is within the scope of the invention to utilize the same for displaying other articles or material having physical characteristics similar to ice cream, such as water ices. Furthermore, the invention contemplates the use of any coating material which is the equivalent of paint in producing a surface which will closely simulate the surface of the article or material being represented. Therefore, I do not desire to be understood as limiting myself, except as required by the following claims when construed in the light of the prior art.

Having thus described the invention, what I claim is:

1. The method of simulating frozen confections which consists in coating a form with paint of a color corresponding to the color of the confection and causing said paint to "run" to produce an appearance of melting.

2. An imitation frozen confection comprising a form having a coating of paint of a color corresponding to the confection which coating has "run" so as to simulate melting.

3. An imitation frozen confection comprising a form having a coating of paint of a color corresponding to the confection and containing granular material which coating has "run" so as to simulate melting.

GEORGE FREDERICK BOESSER.